Aug. 3, 1926.  
M. WINSTON ET AL  
1,594,916  
SLICING APPARATUS  
Filed March 6, 1926  
7 Sheets-Sheet 1

M. WINSTON ET AL 1,594,916

SLICING APPARATUS

Filed March 6, 1926

M. WINSTON ET AL

SLICING APPARATUS

Filed March 6, 1926　　　　　　7 Sheets-Sheet 7

Patented Aug. 3, 1926.

1,594,916

UNITED STATES PATENT OFFICE.

MILLER WINSTON, OF UNIVERSITY CITY, AND ROBERT B. ROULSTON, OF ST. LOUIS, MISSOURI, ASSIGNORS TO BLANKE BAER EXTRACT & PRESERVING COMPANY, OF ST. LOUIS, MISSOURI, A CORPORATION OF MISSOURI.

SLICING APPARATUS.

Application filed March 6, 1926. Serial No. 92,865.

This invention relates to slicing machine for fruit and the like and with regard to certain more specific features to a slicing machine for converting disc-like or rounded portions into cubical or prismic portions.

Among the several objects of the invention may be noted the provision of sequential means for separating from a rounded portion certain peripheral sections involving a rounded contour, then positively holding and accurately slicing the peripherally prismic remainder into other prisms and then providing means for permitting passage of certain nonperipherally arranged curved portions through means which said sliced prisms will not pass. Other objects will be in part obvious and in part pointed out hereinafter.

The invention accordingly comprises the elements and combination of elements, features of construction, and arrangements of parts which will be exemplified in the structure hereinafter described, and the scope of the application of which will be indicated in the following claims.

In the accompanying drawings, in which is illustrated one of various possible embodiments of the invention.

Similar reference characters indicate corresponding parts throughout the several views of the drawings.

Figure 1:
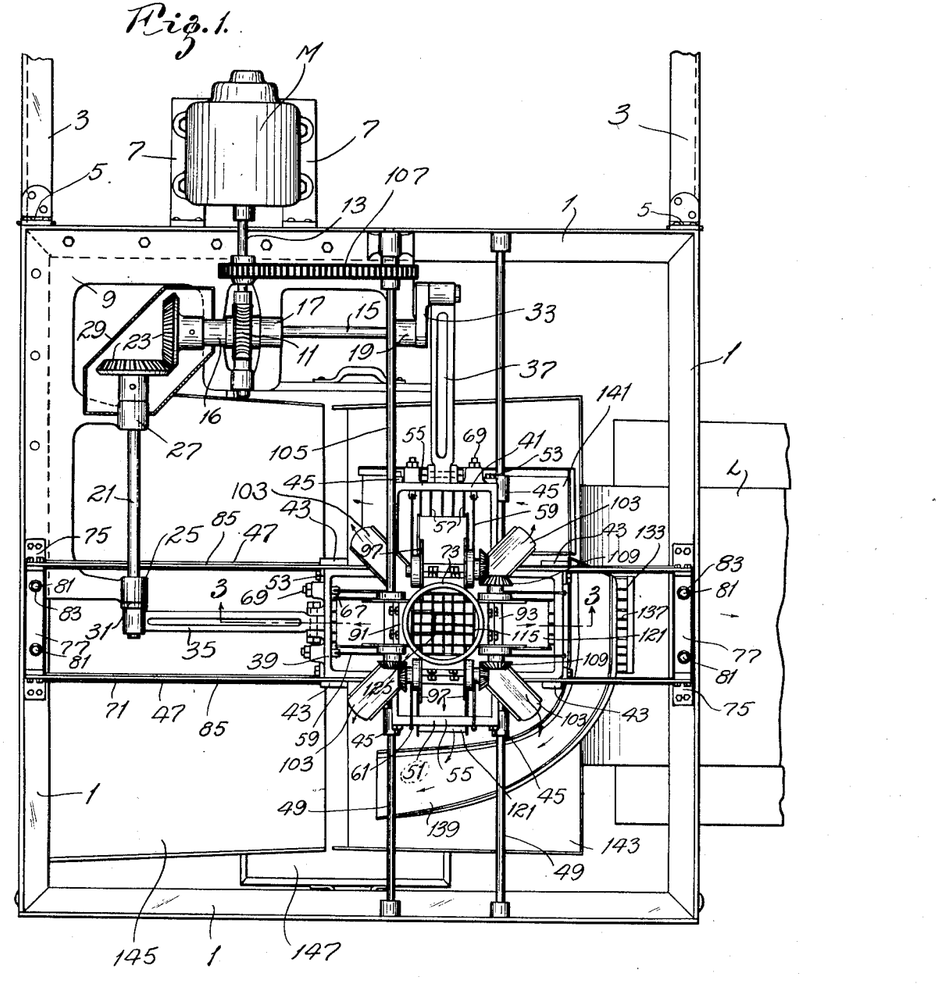
Fig. 1 is a top plan view of the machine.
Figures 9, 14:
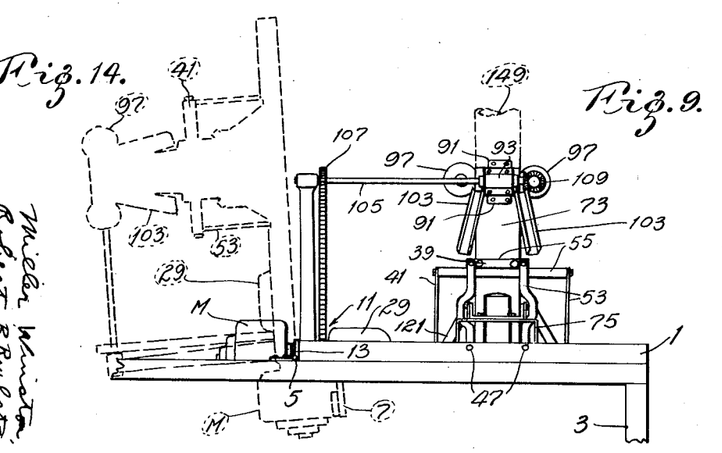
Fig. 9 is a vertical section taken on line 9—9 of Fig. 8.
Fig. 14 is an end view of the machine and shows in dotted lines how it can be pivotally moved for repair and inspection.

Referring now more particularly to Fig. 1, there is illustrated at numeral 1 a rectangular framework resting on and pivoted to a lower structure 3. The pivoting hinges are illustrated at numerals 5. The framework which carries the moving parts of the invention, hereinafter to be described, is adapted to swing vertically on said hinges 5 for purposes of examination and repair of said moving and other parts (Fig. 14).

Extending sidewardly from the frame 1 are brackets 7 which support a driving motor M. Supported on an inward bracket 9 of said frame 1 is a worm-and-wheel speed reducing combination 11 which serves to reduce and transmit movement from the motor shaft 13 to a jack shaft 15. The shaft 15 is rotatably borne in the frame 9 by means of bearings 16, 17 and 19. It is geared in a one to one ratio with a second jack shaft 21 by means of a set of bevel gears 23. The shaft 21 is also rotatably held to the bracket 9 by means of proper bearings 25 and 27. A safety guard 29 preferably encloses the gears 23 and rests on the bracket 9.

The jack shafts 15 and 21 are provided with cranks 31 and 33 to which are pinned connecting rods 35 and 37 respectively. The cranks are preferably of equal throws, though not necessarily so. The rods 35 and 37 are pivotally connected to sliding carriages or cross-heads 39 and 41 respectively. The cross-heads 39 and 41 are each provided with sets of four ears 43 and 45 respectively adapted to slidably engage sets of parallel slides or guides 47 and 49 respectively (see also Fig. 3). The pairs of guides 47 and 49 are properly fastened to the frame 1 and the parallel pairs cross one another at substantially right angles in plan projection. It may be seen that any angle of intersection may be chosen if the correct angular change is made at the bevel gears 23. From the above it may be seen that rotation of the motor will cause reduced rotation of the cranks 31 and 33 whence, by means of the connecting rods 35 and 37, reciprocating motion is translated to the cross-heads 39 and 41 on their respective pairs of guides 47 and 49. The cranks may or may not be phased.

Figures 5, 6:
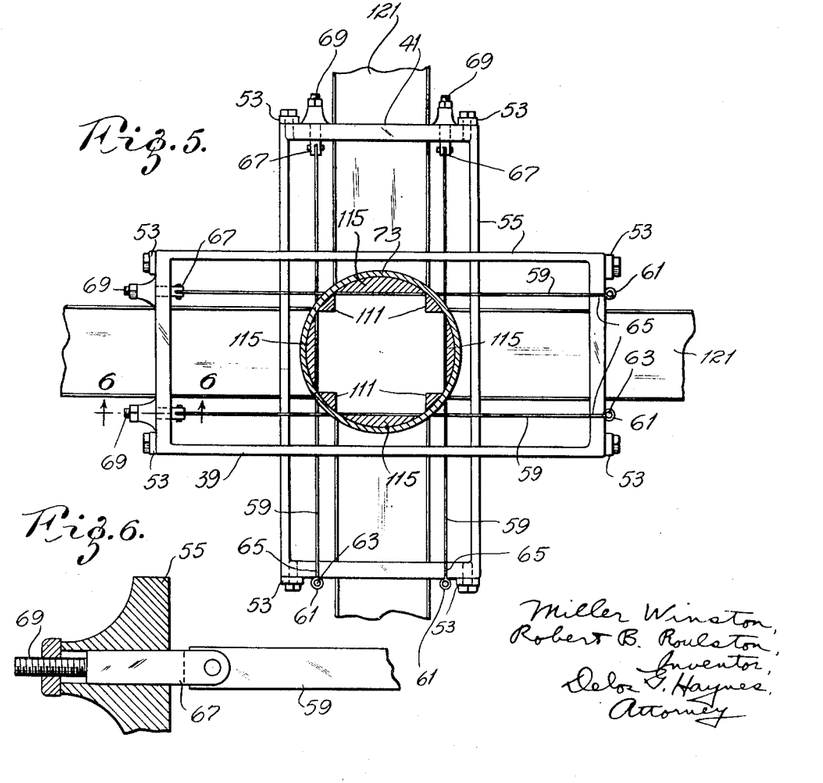
Fig. 5 is a horizontal detail section taken on line 5—5 of Fig. 3.
Fig. 6 is an enlarged vertical section taken on line 6—6 of Fig. 5.
Figure 10:
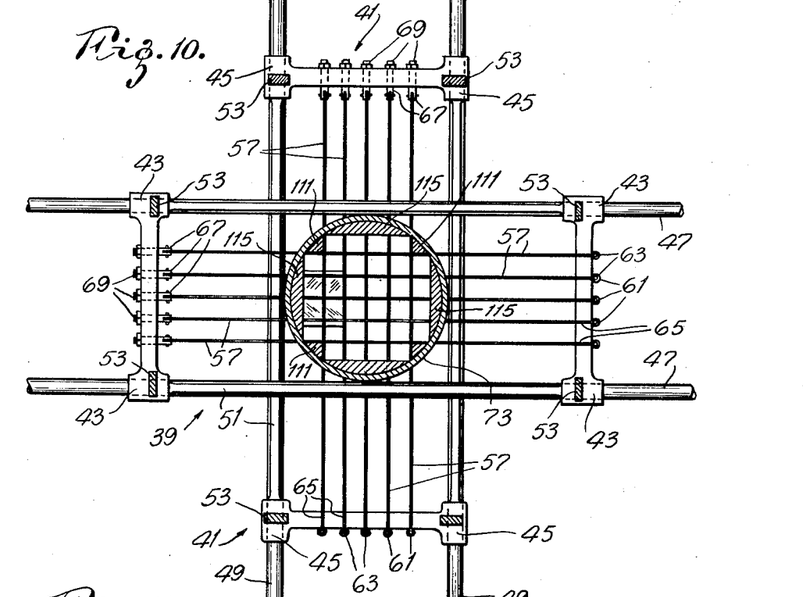
Fig. 10 is a horizontal detail section taken on line 10—10 of Fig. 3.

Each cross-head or carriage 39 and 41 (Figs. 1 to 3, 5 and 10) comprises a lower horizontal frame or bed 51 slidably supported as described on the guides 47 and 49 by the lugs 43 and 45 respectively (Fig. 10). These lower beds 51 are each provided with upwardly extending supporting legs 53 to which legs are bolted upper horizontal beds 55 (Fig. 5). The lower beds 51 support longitudinally arranged gang knives 57 spaced preferably equally, whereby square apertures are formed between the sets of knives in plan view (Fig. 10). The upper beds 55 support longitudinally arranged pairs of separating knives 59. The two upper beds 55 and knives 59 are therefore out of one another's plane but closely arranged in elevation. All the knives are sharpened on their upper edges.

The preferable method of securing the knives 57 and 59 to their respective frames is to form eyes 61 in the ribbon steel of the knives and insert pins 63 therein. The knives are by this means held in notches 65 of the frames. The knives are passed through proper apertures in the device to be described and at their other ends pinned to square or like draw bolts 67 (Fig. 6). The bolts 67 are tightened by a nut and thread combination 69 reacting against machined lugs or portions on the frames. By this means the knives may be readily mounted in the machine, readily removed for sharpening and the like, and may always be kept in proper tension.

It is now evident that the carriages 39 and 41 carry lower sets of gang knives 57 and upper pairs of separating knives above said gang knives. The cutting elements of the respective groups reciprocate across one another and in close proximity to one another but they do not touch one another (see Figs. 2, 3, 5 and 10). It is evident herein that the separating knives are placed above or ahead of the gang knives. This is done for purposes to be made clear.

Figure 7:
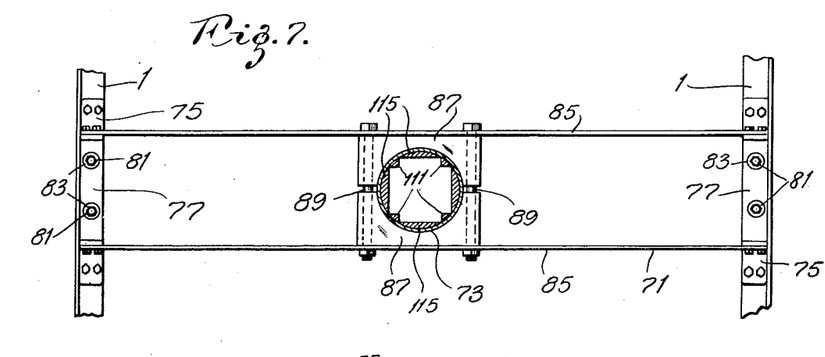
Fig. 7 is a horizontal section taken on line 7—7 of Fig. 3 and shows certain adjusting means.
Figure 8:
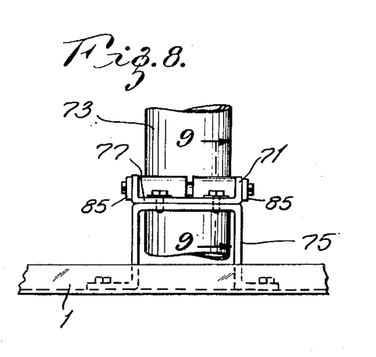
Fig. 8 is a fragmentary end elevation of Fig. 7.

Arranged vertically and adjustably in an adjustable cross bracket 71 is a vertical delivery tube 73. The bracket 71 (Figs. 7 to 9) comprises standards 75 bolted to the frame 1. To these standards are held supporting members 77. The members 77 are adjustable on the standards 75 because of the large holes 79 through which the clamping bolts 81 pass (Fig. 9). Washers 83 serve to hold down the members 77 under clamping action of said bolts 81.

Figure 2:
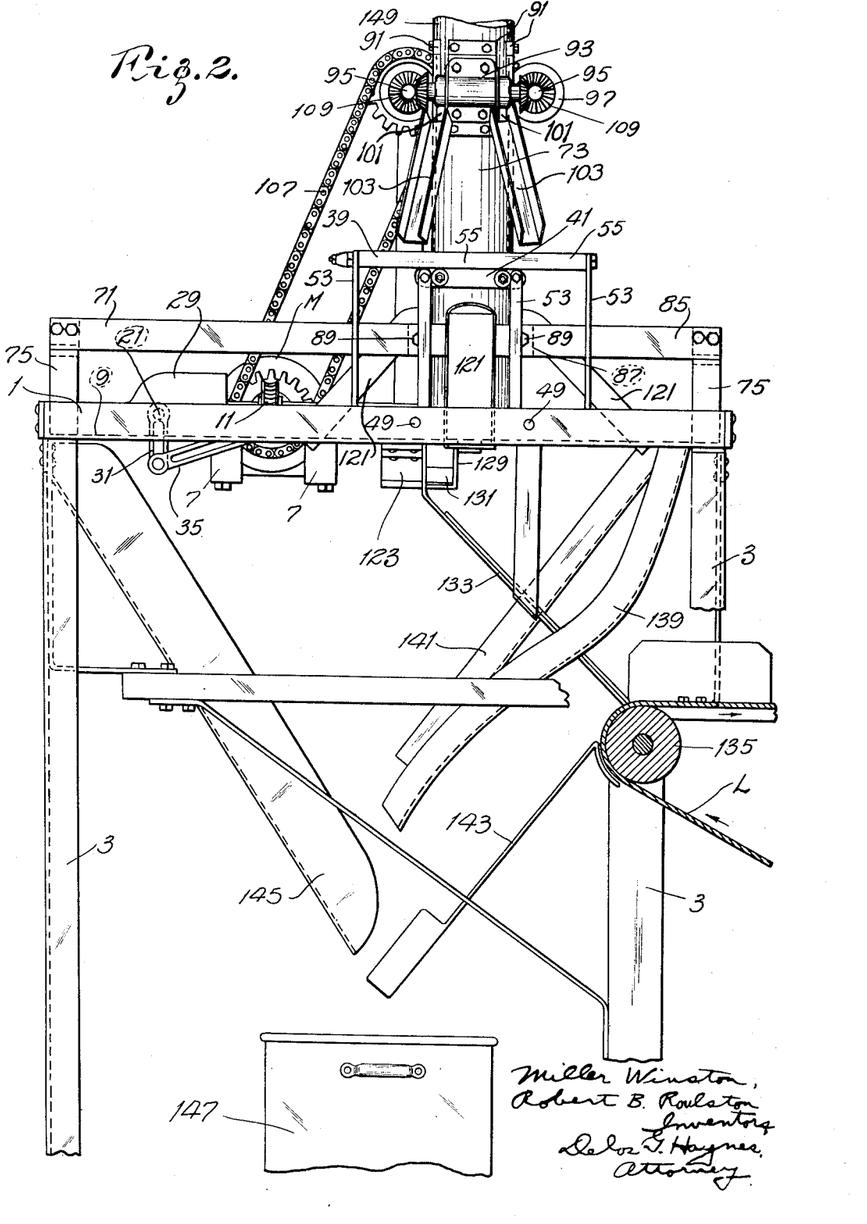
Fig. 2 is a side elevation thereof.
Figures 3, 12:
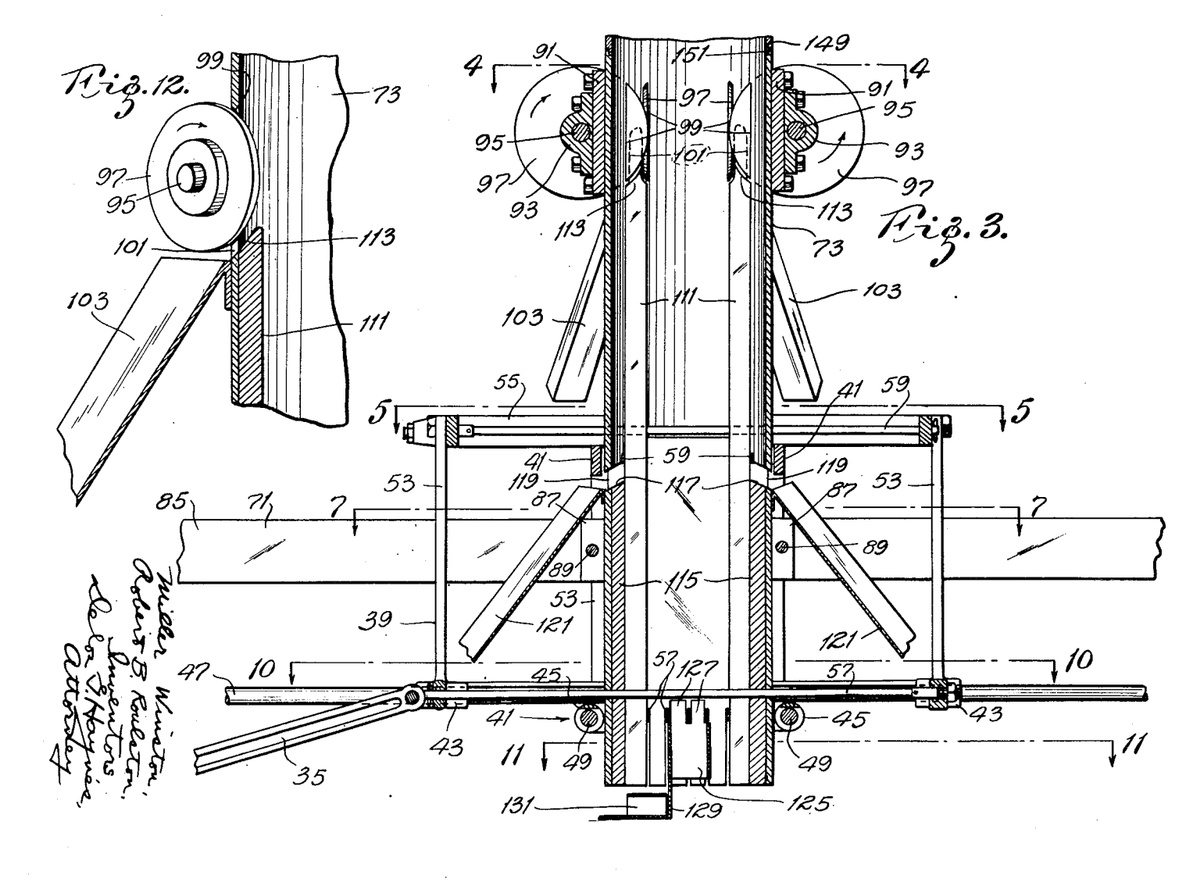
Fig. 3 is a vertical section taken on line 3—3 of Fig. 1.
Fig. 12 is a fragmentary angular section taken on line 12—12 of Fig. 4 and shows a separating wheel.

The members 77 hold cross braces 85 which support saddle clamps 87. The clamps 87 serve to support the delivery tube 73 when said clamps are held together by the bolts 89. The bolts 89 also hold the clamps to the braces 85. It is evident that the tube 73 may be adjustably clamped, that is, by loosening the bolts 89, it may be rotatably or longitudinally shifted as desired, after which the bolts 89 may be tightened. As indicated in Figs. 2 and 3, the tube 73 is positioned between the pairs of guides 47 and 49, and therefore within the limits of all the upper and lower frames 51 and 55. The said frames have a reciprocating motion of such magnitude that the end portions of the frames and attendant parts do not strike said tube 73. This is because proper throws are had at the cranks 31 and 33. The tube 73 is approximately centered with respect to the limits of reciprocation of said frames 51 and 55. The inside diameter of the tube 73 is such as will receive the flat disc-like portions of pineapple or other fruit, which is so shaped when received in the present machine from previously packed cans or the like.

Figure 4:
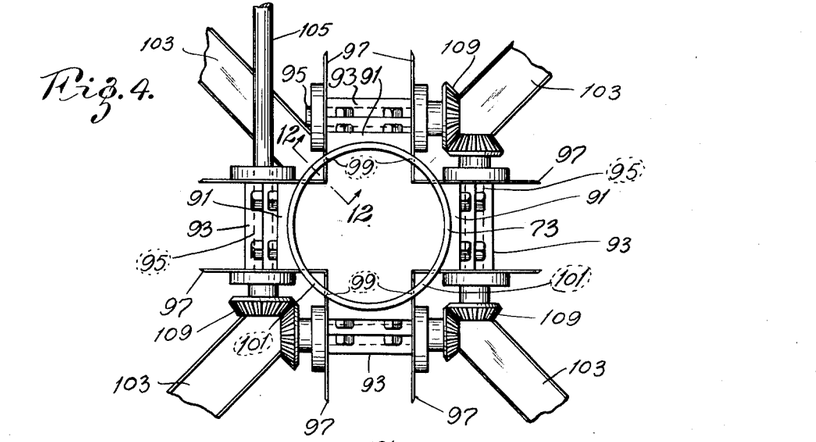
Fig. 4 is a horizontal detail section taken on line 4—4 of Fig. 3.

At its upper end the tube 73 is provided with four flat portions 91 equally spaced (Figs. 3, 4, and 12). To each portion 91 is held a horizontal bearing 93 in which bearing is rotatably borne a shaft 95 which carries two sharpened wheels or cutters 97, one wheel on each side of the respective bearing. Each wheel 97 intersects a slot 99 of the tube 73 and cooperates at right angles with the next wheel 97 located at right angles thereto. Fig. 3 shows how the wheels 97 are sharpened at a forty-five degree angle whereby they may conically engage one another in rolling contact and leave a sharp edge at the point of engagement. The tube 73, at points between the pairs of the intersections 99 between the tube and wheels 97 is provided with openings 101 for permitting exit of portions of the fruit cut-off by the pairs of wheels 97. Troughs 103 are provided for catching these portions and conveying them gravitationally to points to be indicated hereinafter.

A cross shaft 105, which is an extension of one of the shafts 95, serves to drive the wheels 97 from a chain transmission 107 which transmission leads from the motor shaft 13. Bevel gear sets 109 of a one to one ratio transmit rotative motion between the shafts 95 to which said gears are fastened. Hence the wheels 97 rotate with rolling motion and will cut corner pieces C from a disc D if it is fed in a lateral position down the delivery tube 73 (see Figs. 12 and 15). This action serves at once to preform the piece for further cutting at the paired and gang knives below, and also to provide notches at the corners C whereby the piece or portion may be held against twisting as it passes downwardly.

The holding means comprises quarter-round strips 111 aligned flatly with the four pairs of wheels (Figs. 3 and 12), fastened to or cast with the tube 73, and passing downwardly therein to the bottom thereof. It may be seen that the upper ends of the strips 111 are beveled up to a point directly beneath the tangent points of the wheels 97. A sloping portion 113 serves to feed said corner pieces C out to and through the openings 101 to the troughs 103.

Figure 16:
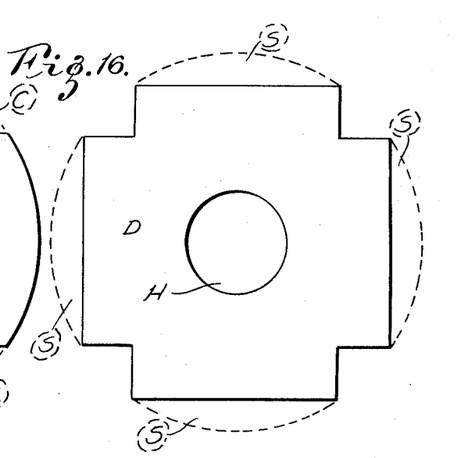

Passing through openings in the tube 73 located below the cornering wheels 97 are the pairs of blades 59. They slidably enter the tube at openings near the junctures between said tube and the flat faces of the quarter round strips 111 (see Figs. 3 and 5). These pairs of blades cut off the rounded segments S (Fig. 16). Below the blades of the pairs there are fastened to the tube segmentally sectioned strips 115. These reach from edge to edge of the quarter-round strips 111 and their outer faces align with the outer faces of the blades 59 (Figs. 1, 3 and 5). Their upper edges are beveled at numerals 117 (Fig. 3) whereby the cut-off segmental portions S (Fig. 16) are led to openings 119 in the tube 73. Fastened to the tube, just below said openings 119 are other troughs 121 for leading away the segments S. The segmental strips 115 lead to the bottom of the tube 73 and like the strips 111 serve to hold the portion of fruit in alignment after removal of undesirable portions thereof.

Figure 17:
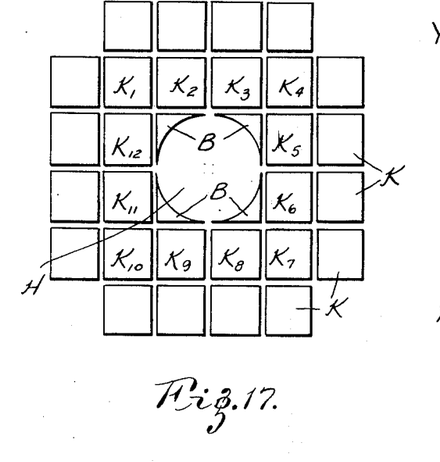
Figure 18:
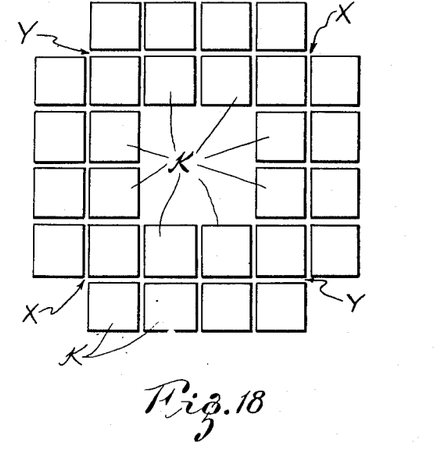

Finally, at its lower end, the tube 73 is slidably intersected by the sets of gang knives 57 of the lower bed 51 of the reciprocating carriages (Figs. 3 and 10). Proper apertures in the tube 73 permit said intersection of the knives 57 therewith. It may be noted that there are five knives in each gang. These knives are spaced and adapted to cut the Fig. 16 portion as indicated in Fig. 17. Four of said knives (two out of each group) are tangentially arranged with respect to the core hole H, which hole is centrally located in most pineapple and like portions. By this means the bicuspidate pieces B (Fig. 17) are cut away from the remainder of the portion. Fig. 18 represents the desirable cubes which are to finally reach the consumer. It is evident that by eliminating certain blades, other prismic shapes beside cubes might be formed.

At the bottom of the tube 73 and properly fastened to a cross member 123 is a square tube 125 adapted to receive the bicuspidate pieces B as they are cut by the knives 57. The purpose of this tube is to prevent the unsymmetrical pieces B from disaligning the symmetrical cubes K, which cubes will not disalign themselves under reciprocating movement of the knives 57. This is because the cubes brace one another on their flat sides while the pieces B are not centrally braced at certain removements of the blades. It is of slight consequence how the pieces B become broken or frayed within their tube 125, if the cubes K outside of the tube 125 (braced by the flat sides of said tube) remain in shape. Four fingers 127 reach up from the tube 125 and between the lower gang of blades 57 to brace the uncompleted portions as they come through the upper gang of blades. The arm 129 which holds the tube 125 to the member 123 has a ridged hip 131 formed thereover, in order that cut portions of fruit may be deflected therefrom.

Beneath the tube 73 a sloping grate 133 is formed. This grate is made fast to said member 123 and leads to a moving belt L which is supported on proper rolls 135 of the frame 3. Other operations, not herein referred to are performed on said belt L.

Figure 11:
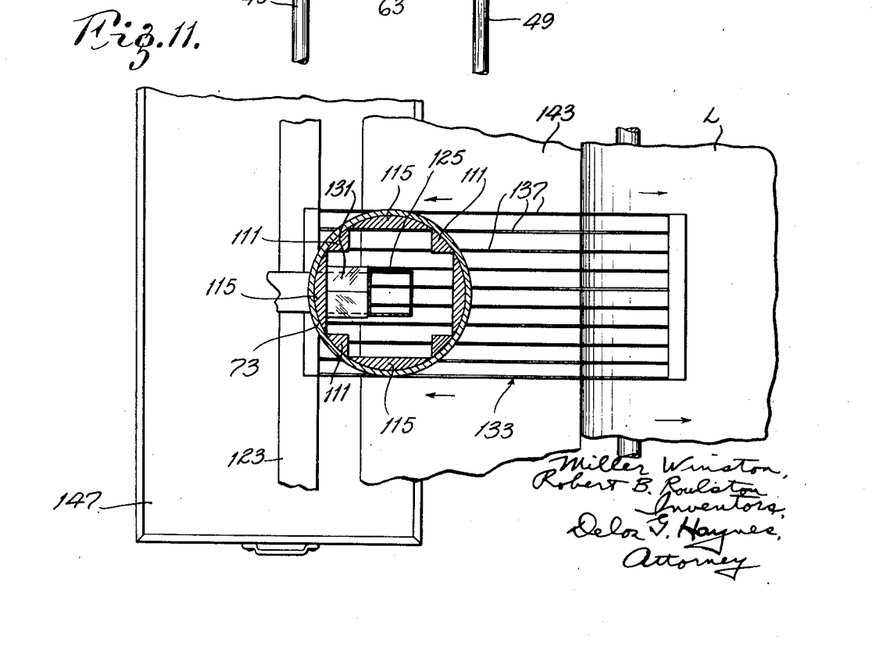
Fig. 11 is a horizontal detail section taken on line 11—11 of Fig. 3.
Figure 13:
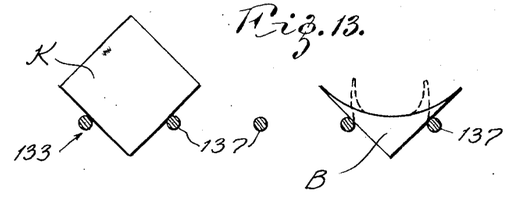
Fig. 13 is a diagrammatic illustration showing how certain sliced portions will pass a grid and others not.

All of the cubes K and bicuspidate portions B descend from the tube 73 to the grate 133. The bars 137 of the grate (Figs. 11 and 13) are pitched at such a distance that the cubes K cannot pass through, while the portions B will pass through, regardless of the position in which the portions B descend upon the grate. If they descend as illustrated in Fig. 13, the relatively weak cuspidate corners of said pieces B give way, whereby the pieces B pass the grate while the cubes K do not pass, but pass down to the belt L. The pieces illustrated in Fig. 18 are therefore the ones finally delivered from the machine for further operations. If the blades which cut the gashes such as X and Y (Fig. 18) are removed, then rectangular pieces corresponding to pieces K will be formed and the separating or sifting action at the grate will evidently take place nevertheless. In the present embodiment the projected distance between all blades is equal to the thickness of the disced slices fed to the machine. This relationship might be varied at the will of a designer.

In order to properly lead the undesirable pieces C and S from the troughs or chutes 103 and 121 respectively, a receiving chute 139 takes pieces from three of said troughs while another chute 141 takes pieces from two others. The remaining three chutes feed directly into large deflector pans 143 and 145, into which pans said chutes 139 and 141 also feed. All the undesirable pieces fall into a receptical 147 from which they may be removed at intervals. As indicated in the drawings (Figs. 1 and 2) the main chutes 139, 141, 143 and 145 are properly fastened to the framework of the machine.

Fig. 14 indicates how the frame 1 with the moving part thereon may be swung upwardly on the hinges 5. This swinging action may be accomplished while the machine is running, so that the causes of flaws in operation may readily be detected or repaired without unnecessary shut down and delay. By this means a machine may be readily cleaned and dried as well as oiled at the end of a period or work.

In Fig. 3 is illustrated an auxiliary delivery tube 149 adapted to fit the tube 73 at a loose lap or other joint 151. This tube 149 may be independently loaded with fruit slices, then joined to the tube 73 and the slices pushed down. While one tube 149 is on the tube 73 another like one may be in the process of manual loading so that the action of the device is continuous.

It is to be understood that pieces which go to the receptacle 147 are not wasted but are used in products not requiring a particular shape such as illustrated in Fig. 18. The reference to shape regards the Fig. 18 elements K; not the assembly shape which is not retained.

Operation of the machine is as follows:

Round horizontal slices having each a central hole therein are fed into the tube 73 from the tube 149. These slices are annular in shape. The motor is running, the carriages reciprocating, and the wheel blades 97 rotating downwardly (inside the tube 73).

The separating wheels 97 notch out the portions C (Fig. 15) as the discs descend by gravity. The quarter-round strips enter the notches which are left as the corners C are ejected from the openings 101, to pass down the troughs 103 to the receptacle 147 directly, or via the troughs 139 and 141.

Figure 15:
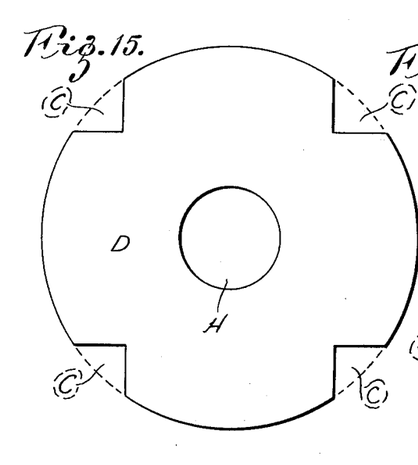
Figs. 15 to 18 are diagrams illustrating the sequence of slicing and separating operations.

The solid-line portion illustrated in Fig. 15 then descends straight down without twisting to the upper pairs of reciprocating separating knives 59 (Figs. 3 and 5). These knives 59 cut away the elements or segments S (Fig. 16). Beneath the knives the beveled segmental strips 115 serve to eject the segments S from the openings 119 and into the troughs 121 to the receptacle 147, either directly or by way of troughs 139 and 141, depending upon the troughs 121 in question (Fig. 1). The strips 115 serve to fill the voids left by cutting away the segments S, that is, as the fruit descends further down the tube 73.

Next, the solid-line peripherally prismatic portion shown in Fig. 16 descends upon the reciprocating gang knives. It is held absolutely true on all sides by flat walls. The knives cut said portion as illustrated in Fig. 17, while the bracing tube 125 prevents central jamming of the cubes $K_1$—$K_{12}$, which the bicuspidate portions B could not otherwise brace, as a given movement of a set of knives 57 would tend to push certain of the cubes $K_1$—$K_{12}$ centrally. The cubes $K_1$—$K_{12}$, it is to be understood, are merely particularly designated cubes of the general class herein marked with the letter K.

Lastly, all the portions or elements K and B of Fig. 17 fall to the rack or grid 133 (Fig. 13). The portions B fall through as described, while the portions K slide down the belt L. It should be remembered that fruit pulp or tissue is watery, so that the thin cuspidate edges of the portions B have little or no strength. Finally the cubes K illustrated in Fig. 18 appear at the belt L, although the arrangement of cubes K shown in said Fig. 18 is evidently not maintained.

It is evident that the discs D may be fed into the machine one on top of the other as a continuous laminated cylinder and the operation will be continuously perfect.

In view of the above, it will be seen that the several objects of the invention are achieved and other advantageous results attained.

As various possible embodiments might be made of the above invention and as various changes might be made in the embodiment above set forth, it is to be understood that all matter herein set forth or shown in the accompanying drawings is to be interpreted as illustrative and not in a limiting sense.

We claim:

1. A slicer comprising reciprocating gang-knives for final shaping of portions, reciprocating knives and cutting wheels thereabove for separating certain undesirable portions, means for ejecting said undesirable portions, and means located below the said gang knives for directing the movement of desirable portions while permitting passage of other undesirable portions therethrough.

2. A slicer comprising reciprocating gang-knives for final shaping of portions, reciprocating knives and cutting wheels thereabove for separating certain undesirable portions, means for ejecting said undesirable portions, before said gang knives are reached, and means located below the said gang knives for directing the movement of desirable portions while permitting passage of other undesirable portions therethrough.

3. A slicer comprising reciprocating gang knives for final shaping of portions, reciprocating knives and cutting wheels thereabove for separating certain undesirable portions, means for ejecting said undesirable portions, before said gang knives are reached, and means located below the said gang knives for directing the movement of desirable portions while permitting passage of other undesirable portions therethrough, said last named means comprising a grate.

4. A slicer comprising a tube for receiving disc-like portions, said portions having central holes therein, angularly arranged cutters for notching said portions, strips adapted to pass into said portions at the notches to prevent twisting, knives adapted to separate segmental portions from between the notches, strips adapted to pass into the open segment so left whereby the remainder of the original portion is positively held in alignment, gang knives adapted to slice said remainder into prismatic and bicuspidate portions, and means for separating said bicuspidate from said prismatic portions.

5. A slicer comprising a tube for receiving disc-like portions, said portions having central holes therein, angularly arranged wheel cutters for notching said portions, strips adapted to pass into said portions at the notches to prevent twisting, reciprocating knives adapted to separate segmental portions from between the notches, strips adapted to pass into the open segment so left whereby the remainder of the original portion is positively held in alignment, gang knives adapted to slice said remainder into prismatic and bicuspidate portions, and means for separating said bicuspidate from said prismatic portions.

6. A slicer comprising a tube for receiving disc-like portions, said portions having central holes therein, angularly arranged wheel cutters for notching said portions, strips adapted to pass into said portions at the notches to prevent twisting, reciprocating knives adapted to separate segmental portions from between the notches, strips adapted to pass into the open segment so left whereby the remainder of the original portion is positively held in alignment, gang knives adapted to slice said remainder into prismatic and bicuspidate portions, and means for separating said bicuspidate from said prismatic portions.

7. A slicer comprising a tube for receiving disc-like portions, said portions having central holes therein, angularly arranged cutters for notching said portions, strips adapted to pass into said portions at the notches to prevent twisting, knives adapted to separate segmenal portions from between the notches, strips adapted to pass into the open segment so left whereby the remainder of the original portion is positively held in alignment, gang knives adapted to slice said remainder into prismatic and bicuspidate portions, means for separating said bicuspidate from said prismatic portions and reciprocating frames for reciprocating the segment-separating and the gang knives together.

8. A slicer for fruit and the like comprising a hinged frame, angularly arranged pairs of guides thereon, means for holding a cylinder between the guides at their projected intersection, reciprocating carriages on the guides, sets of gang knives on the carriages intersecting the cylinder and separating knives thereon located above the gang knives intersecting the cylinder, rotary notching knives intersecting said cylinder above all the reciprocating knives, and means on the frame for rotating the rotary knives and reciprocating the carriages.

9. A slicer for fruit and the like comprising a frame, angularly arranged pairs of guides thereon, means for holding a cylinder between the guides at their projected intersection, reciprocating carriages on the guides, sets of knives on the carriages intersecting the cylinder, rotary notching knives intersecting said cylinder above the knives on the carriages, and means on the frame for rotating the rotary knives and reciprocating the carriages.

10. A slicer for fruit and the like comprising a hinged frame, angularly arranged pairs of guides thereon, means for adjustably holding a cylinder between the guides at their projected intersection, reciprocating carriages on the guides, sets of gang knives on the carriages intersecting the cylinder and separating knives thereon located above the gang knives intersecting the cylinder, rotary notching knives intersecting said cylinder above all the reciprocating knives, and means on the frame for rotating the rotary knives and reciprocating the carriages.

11. A device for slicing portions of fruit and the like comprising a tube, means for feeding portions through the tube, means toward one end of the tube for notching said portions as they enter the tube, means toward the other end of said tube for finally slicing remainders of said portions, means midway of the said two means adapted to separate certain peripherally arranged undesirable portions, and means outside the tube adapted to receive sliced portions therefrom and adapted to permit passage of undesirably shaped portions therethrough while not permitting such passage of desirably shaped portions.

12. A device for slicing portions of fruit comprising a tube, means for feeding annular portions through the tube, means for prismatically slicing certain sections of said portions as they leave the tube, means within the tube for separating undesirable peripheral elements of the annular portions before the said slicing means is reached, and means outside the tube for separating certain undesirable centrally located elements after prismatic slicing of the portions has been accomplished.

13. A device for slicing portions of fruit comprising a tube, means for feeding annular portions through the tube, means for prismatically slicing certain sections of said portions as they leave the tube, means within the tube for separating undesirable peripheral elements of the annular portions before the said slicing means is reached and means outside the tube for separating certain undesirable centrally located elements after prismatic slicing of the portions has been accomplished, and means associated with the prismatic slicing means for bracing the desirable portions as the undesirable elements are cut therefrom.

14. A device for slicing portions of fruit and the like comprising a tube, means for feeding portions through the tube, means toward one end of the tube for notching said portions as they enter the tube, comprising pairs of cooperating and rotating wheels, means toward the other end of said tube for finally slicing remainders of said portions, comprising laterally arranged ganges of reciprocating blades, means midway of the said two means adapted to separate certain peripherally arranged undesirable portions, comprising laterally arranged pairs of blades reciprocating with the said gangs of blades, and means outside the tube adapted to receive sliced portions therefrom and adapted to permit passage of undesirably shaped portions therethrough while not permitting such passage of desirably shaped portions, said last-named separating means comprising a grating.

15. A device for slicing portions of fruit and the like comprising a tube, means for feeding portions through the tube, means toward one end of the tube for notching said portions as they enter the tube, comprising pairs of cooperating and rotating wheels, means toward the other end of said tube for finally slicing remainders of said portions, comprising laterally arranged gangs of reciprocating blades, means midway of the said two means adapted to separate certain peripherally arranged undesirable portions, comprising laterally arranged pairs of blades reciprocating with the said gangs of blades and means outside the tube adapted to receive sliced portions therefrom and adapted to permit passage of undesirably shaped portions therethrough while not permitting such passage of desirably shaped portions, said last-named separating means comprising a grating, and means within the tube for holding the passing portion in alignment as peripheral portions are cut therefrom.

16. A device for slicing portions of fruit and the like comprising a tube, means for feeding portions through the tube, means toward one end of the tube for notching said portions as they enter the tube, comprising pairs of cooperating and rotating wheels, means toward the other end of said tube for finally slicing remainders of said portions, comprising laterally arranged gangs of reciprocating blades, means midway of the said two means adapted to separate certain peripherally arranged undesirable portions, comprising laterally arranged pairs of blades reciprocating with the said gangs of blades and means outside the tube adapted to receive sliced portions therefrom and adapted to permit passage of undesirably shaped portions therethrough while not permitting such passage of desirably shaped portions, said last-named separating means comprising a grating and means within the tube for holding the passing portion in alignment as peripheral portions are cut therefrom, said last-named means comprising longitudinal strips within the tube shape to align with the voids left in the said portion.

17. A slicer comprising reciprocating gang knives for final shaping of portions, reciprocating knives and cutting wheels thereabove for separating certain undesirable portions, means for ejecting said undesirable portions, and means located below the said gang knives for sifting other undesirable portions from the desirable portions.

18. A slicer comprising reciprocating gang knives for final shaping of portions, reciprocating knives and cutting wheels thereabove for separating certain undesirable portions, means for ejecting said undesirable portions, and means located below the said gang knives for sifting other undesirable portions from the desirable portions, said last-named means comprising a grating.

In testimony whereof, we have signed our names to this specification this 4th day of March, 1926.

MILLER WINSTON.
ROBERT B. ROULSTON.